United States Patent
Xu et al.

(10) Patent No.: US 12,174,824 B2
(45) Date of Patent: Dec. 24, 2024

(54) METHOD FOR DENOISING CLICK DATA, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Wei Xu, Beijing (CN); Xiaoling Xia, Beijing (CN); Junxiang Jiang, Beijing (CN); Chengtai Cao, Beijing (CN); Bolei He, Beijing (CN); Kunbin Chen, Beijing (CN); Wei He, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/147,823

(22) Filed: Dec. 29, 2022

(65) Prior Publication Data
US 2023/0132618 A1    May 4, 2023

(30) Foreign Application Priority Data
Dec. 30, 2021   (CN) .......................... 202111650357.0

(51) Int. Cl.
*G06F 16/23*   (2019.01)
*G06F 9/451*   (2018.01)
(Continued)

(52) U.S. Cl.
CPC .......... *G06F 16/2365* (2019.01); *G06F 9/451* (2018.02); *G06F 16/906* (2019.01);
(Continued)

(58) Field of Classification Search
CPC ........................... G06F 16/2365; G06F 18/241
(Continued)

(56) References Cited

U.S. PATENT DOCUMENTS 10,592,555 B1 * 3/2020 Zhang .................. G06Q 30/016
2010/0211588 A1 * 8/2010 Jiang ..................... G06F 16/332
                                                          707/E17.109
(Continued)

FOREIGN PATENT DOCUMENTS

CN   111352976   6/2020
CN   111681059   9/2020
(Continued)

OTHER PUBLICATIONS

Himel Dev et al., "Identifying Frequent User Tasks from Application Logs," IUI 2017, Interactive Programming and Automation, Mar. 13-16, 2017, Limassol, Cyprus.
(Continued)

*Primary Examiner* — Hosain T Alam
*Assistant Examiner* — Nicholas E Allen
(74) *Attorney, Agent, or Firm* — Hodgson Russ LLP

(57) ABSTRACT

A method for denoising click data includes: acquiring a set of click data including pieces of first click data and a real label corresponding to each piece of first click data; extracting feature vectors of each piece of first click data with a graph model; dividing the feature vectors into sets of feature vectors; obtaining trained binary classification models by training binary classification models with the sets of feature vectors; for each of the feature vectors, obtaining prediction values corresponding to the feature vector by predicting the feature vector with the trained binary classification models, and calculating a prediction label of the feature vector based on the prediction values of the feature vector; and removing noise data in the pieces of first click data, based on the pieces of first click data, the real label and the prediction label of each piece of first click data.

9 Claims, 3 Drawing Sheets

(51) Int. Cl.
  *G06F 16/906* (2019.01)
  *G06F 18/10* (2023.01)
  *G06F 18/213* (2023.01)
  *G06F 18/241* (2023.01)
  *G06F 18/2415* (2023.01)

(52) U.S. Cl.
  CPC ............ *G06F 18/241* (2023.01); *G06F 18/10* (2023.01); *G06F 18/213* (2023.01); *G06F 18/2415* (2023.01)

(58) Field of Classification Search
  USPC .......................................................... 707/692
  See application file for complete search history.

(56) References Cited

U.S. PATENT DOCUMENTS

| | | | |
|---|---|---|---|
| 2011/0307479 A1* | 12/2011 | Yin | G06F 16/9535 707/E17.108 |
| 2015/0161107 A1* | 6/2015 | Tur | G06F 40/284 704/9 |
| 2016/0110794 A1* | 4/2016 | Hsiao | G06F 18/214 705/26.7 |
| 2016/0162779 A1* | 6/2016 | Marcus | G06N 20/10 706/12 |
| 2017/0180497 A1* | 6/2017 | Comstock | H04L 67/02 |
| 2018/0218327 A1* | 8/2018 | Kenthapadi | G06Q 10/1053 |
| 2021/0027194 A1* | 1/2021 | Monaghan | G06N 5/02 |
| 2021/0034945 A1* | 2/2021 | Mane | G06N 3/045 |
| 2021/0233119 A1* | 7/2021 | Xu | G06N 20/00 |
| 2021/0256355 A1 | 8/2021 | Chen et al. | |
| 2021/0399911 A1* | 12/2021 | Jorasch | H04L 12/1822 |

FOREIGN PATENT DOCUMENTS

| | | |
|---|---|---|
| CN | 112182391 A | 1/2021 |
| CN | 112257855 A | 1/2021 |
| CN | 113342792 A | 9/2021 |

OTHER PUBLICATIONS

EPO, Extended European Search Report for EP Application No. 22211845.7, Apr. 19, 2023.

CNIPA, First Office Action for CN Application No. 202111650357.0, Sep. 28, 2023.

JPO, Office Action for JP Application No. 2022-211722, Mar. 5, 2024.

* cited by examiner

METHOD FOR DENOISING CLICK DATA, ELECTRONIC DEVICE AND STORAGE MEDIUM

CROSS REFERENCE TO RELATED APPLICATION

This application claims priority to Chinese Patent Application No. 202111650357.0, filed on Dec. 30, 2021, the entire disclosure of which is incorporated herein by reference.

TECHNICAL FIELD

The disclosure relates to a field of artificial intelligence technologies, and particularly to technical fields of big data and cloud services.

BACKGROUND

At present, a method for denoising click data is to record a duration when a user views a piece of content by event tracking in an application program, considering an expected duration of completing viewing the piece of content, and filtering noises based on a ratio of an actual duration to the expected duration. Event tracking in the application program needs massive labor cost and development cost, and there are some noises in the denoised data, and a denoising effect on the click data is not significant enough.

SUMMARY

According to a first aspect of the disclosure, a method for denoising click data is performed by an electronic device. The method includes: acquiring a set of click data, in which the set of click data comprises pieces of first click data and a real label corresponding to each piece of first click data; extracting a feature vector of each piece of first click data with a graph model; dividing a plurality of feature vectors into sets of feature vectors; obtaining trained binary classification models by training binary classification models with the sets of feature vectors; for each of the feature vectors, obtaining prediction values of the feature vector by predicting the feature vector with the trained binary classification models; for each of the feature vectors, calculating a prediction label of the feature vector based on the prediction values of the feature vector; and removing noise data in the pieces of first click data, based on the pieces of first click data, the real label and the prediction label of each piece of first click data.

According to a second aspect of the disclosure, an electronic device is provided, including: at least one processor; and a memory communicatively connected to the at least one processor. The memory is stored with instructions executable by the at least one processor, and when the instructions are performed by the at least one processor, the at least one processor is caused to perform a method for denoising click data. The method includes: acquiring a set of click data, in which the set of click data comprises pieces of first click data and a real label corresponding to each piece of first click data; extracting a feature vector of each piece of first click data with a graph model; dividing a plurality of feature vectors into sets of feature vectors; obtaining trained binary classification models by training binary classification models with the sets of feature vectors; for each of the feature vectors, obtaining prediction values of the feature vector by predicting the feature vector with the trained binary classification models; for each of the feature vectors, calculating a prediction label of the feature vector based on the prediction values of the feature vector; and removing noise data in the pieces of first click data, based on the pieces of first click data, the real label and the prediction label of each piece of first click data.

According to a third aspect of the disclosure, a non-transitory computer-readable storage medium stored with computer instructions is provided, the computer instructions are configured to perform a method for denoising click data. The method includes: acquiring a set of click data, in which the set of click data comprises pieces of first click data and a real label corresponding to each piece of first click data; extracting a feature vector of each piece of first click data with a graph model; dividing a plurality of feature vectors into sets of feature vectors; obtaining trained binary classification models by training binary classification models with the sets of feature vectors; for each of the feature vectors, obtaining prediction values of the feature vector by predicting the feature vector with the trained binary classification models; for each of the feature vectors, calculating a prediction label of the feature vector based on the prediction values of the feature vector; and removing noise data in the pieces of first click data, based on the pieces of first click data, the real label and the prediction label of each piece of first click data.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope of the present disclosure. Similarly, for clarity and conciseness, descriptions of well-known functions and structures are omitted in the following descriptions.

In the above method of the disclosure, a more accurate feature vector may be extracted by extracting a plurality of feature vectors of first click data with a graph model, and the extracted feature vectors are divided into at least two sets of feature vectors. At least two different binary classification models are trained with different sets of feature vectors in the at least two feature vectors. For each of the feature vectors, the at least two trained binary classification models are configured to predict the feature vector and at least two prediction values for the feature vector is obtained. A prediction label of each feature vector is calculated based on the at least two prediction values corresponding to each feature vector, which may more accurately represent a prediction value of the piece of first click data corresponding to the feature vector being clicked by a user and enhance the accuracy of determining whether the piece of first click data is noise data. In this way, click data may be denoised based on the click data itself without event tracking in the application program in advance, which saves massive labor cost and development cost.

Figure 1:
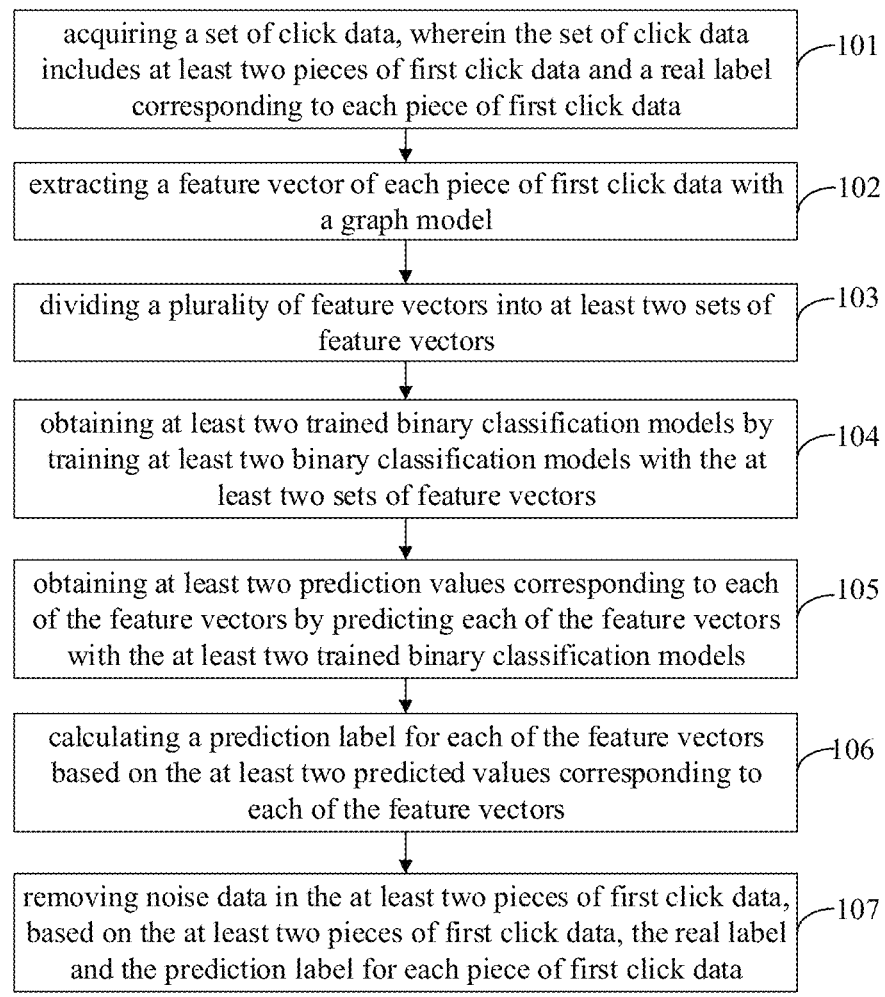
FIG. 1 is a flowchart of a method for denoising click data according to an embodiment of the disclosure.

In order to reduce labor cost and development cost in denoising the click data and enhance the accuracy of denoising the click data, as illustrated in FIG. 1, a method for denoising click data according to an embodiment of the disclosure includes the following steps at 101-107.

At 101, a set of click data is acquired. The set of click data includes at least two pieces of first click data and a real label corresponding to each piece of first click data.

The set of click data is acquired, in which the set of click data includes the at least two pieces of first click data and the real label corresponding to each piece of first click data. The first click data indicates that a piece of content is recommended to a user, and the real label for the piece of first click data indicates whether the user clicks the recommended content.

For example, when a certain piece of first click data is {user identifier: 256, recommended content identifier: 556} and the real label for the piece of first click data is 1, it is indicated that a piece of recommended content with the recommended content identifier 556 is recommended to the user with the user identifier 256, and the user clicks the recommended content.

At 102, a feature vector of each piece of first click data is extracted with a graph model.

At 103, a plurality of feature vectors are divided into at least two sets of feature vectors.

The plurality of feature vectors are divided into the at least two sets of feature vectors.

At 104, at least two trained binary classification models are obtained by training at least two binary classification models with the at least two sets of feature vectors.

The at least two trained binary classification models are obtained by training the at least two binary classification models with the at least two sets of feature vectors. As different sets of feature vectors in the at least two sets of feature vectors are selected when each binary classification model is trained, prediction abilities of the at least two binary classification models trained are different.

For example, the plurality of feature vectors are randomly divided into three sets of feature vectors A, B and C, and three binary classification models need to be trained. The first binary classification model is trained with A and B selected as training sets and C as a validation set, to obtain a trained binary classification model D. The second binary classification model is trained with B and C selected as training sets and A as a validation set, to obtain a trained binary classification model E. The third binary classification model is trained with A and C selected as training sets and B as a validation set, to obtain a trained binary classification model F.

At 105, at least two prediction values corresponding to each of the feature vectors are obtained by predicting each of the feature vectors with the at least two trained binary classification models.

The at least two prediction values corresponding to each of the feature vectors are obtained by predicting each of the feature vectors with the at least two trained binary classification models. That is, each piece of first click data has at least two prediction values.

At 106, a prediction label for each of the feature vectors is calculated based on the at least two prediction values corresponding to each of the feature vectors.

The prediction label for each of the feature vectors is calculated based on the at least two prediction values corresponding to each of the feature vectors. In the embodiment, the prediction label of each feature vector is obtained by averaging the at least two prediction values corresponding to each feature vector.

At 107, noise data in the at least two first click data are removed based on the at least two first click data, the real label and the predictive label of each piece of first click data.

The noise data in the at least two pieces of first click data are removed, based on the at least two pieces of first click data, the real label and the prediction label of each piece of first click data.

A more accurate feature vector may be extracted by extracting a plurality of feature vectors of first click data with a graph model, and the extracted feature vectors are divided into at least two sets of feature vectors. At least two different binary classification models are trained with different sets of feature vectors in the at least two feature vectors. For each of the feature vectors, the at least two trained binary classification models are configured to predict the feature vector and at least two prediction values for the feature vector is obtained. A prediction label of each feature vector is calculated based on the at least two prediction values corresponding to each feature vector, which may more accurately represent a prediction value of the piece of first click data corresponding to the feature vector being clicked by a user and enhance the accuracy of determining whether the piece of first click data is noise data. In this way, click data may be denoised based on the click data itself without event tracking in the application program in advance, which saves massive labor cost and development cost.

Figure 2:
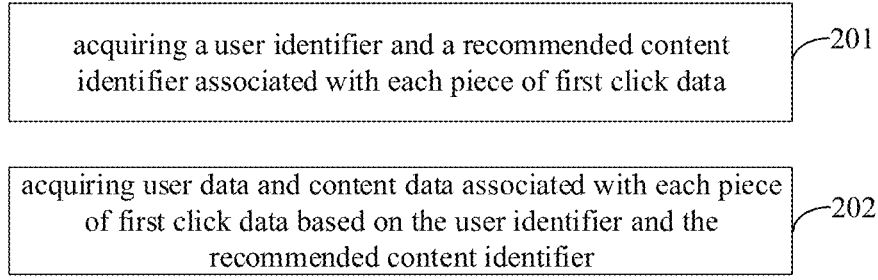
FIG. 2 is flowchart of a method for acquiring the set of click data according to an embodiment of the disclosure.

In an implementation shown in FIG. 2, acquiring the set of click data at 101, includes the following steps at 201-202.

At 201, a user identifier and a recommended content identifier associated with each piece of first click data are acquired.

The user identifier and the recommended content identifier associated with each piece of first click data are acquired based on the plurality of pieces of first click data included in the set of click data.

For example, a piece of first click data is {user identifier: 256, recommended content identifier: 556}, the user identifier associated with the piece of first click data is 256, and the recommended content identifier is 556.

At 202, user data and content data associated with each piece of first click data are acquired based on the user identifier and the recommended content identifier associated with each piece of first click data.

The user data and content data associated with first click data are acquired based on the user identifiers and the recommended content identifiers associated with the first click data.

For example, when a user identifier associated with a piece of first click data is 256, and a recommended content identifier is 556, a user with the user identifier 256 is searched from a database, and user data of the user are acquired based on the user. The user data includes data, such as basic data of a user (for example, a department where the user is located, a sequence where the user is located and a title of a user), user profile data, which may be for example, ability label (label data mined from a user resume and user work documents), interest label (label data mined from user historical click data on recommended content, etc.), user relationship data (intimate users, reporting and guidance relationship, users of the same project group, etc.), user creation content data (a project document, promotion materials, Objectives and Key Results OKR materials, a user code and a user resume). The recommended content with the recommended content identifier 556 is searched from a database.

The dimension of a feature vector extracted with the graph model from a piece of first click data may be increased by acquiring the user data and the content data associated with each piece of first click data, so that the information included in the extracted feature vector is rich, which further enhances the accuracy of prediction.

Figure 3:
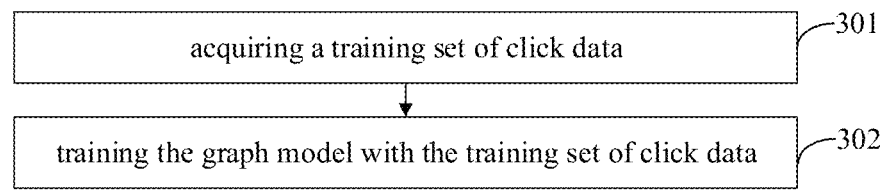
FIG. 3 is flowchart of a method for denoising click data according to an embodiment of the disclosure.

In an implementation shown in FIG. 3, before extracting the feature vector of each piece of first click data with the graph model at block 102, the method further includes the following steps at 301-302.

At block 301, a training set of click data is acquired.

The training set of click data is acquired, in which the training set of click data includes pieces of click data for training that may be historical click data of a user.

At 302, the graph model is trained with the training set of click data.

A LightTGCN model may be selected as the graph model, to construct a plurality of nodes based on pieces of data in each first click data, construct a heterogeneous graph based on the plurality of nodes, and constitute a feature vector by extracting feature data of each node.

The graph model is trained with the training set of click data, the feature vector of each click data in the training set of click data is extracted with the graph model, and parameters in the graph model are updated based on the extracted feature vector, which may improve the ability of extracting a feature vector of each click data with the graph model, so that dimensions of the feature vector extracted by the trained graph model are more, and information is richer, which further improves the accuracy of prediction.

Figure 4:
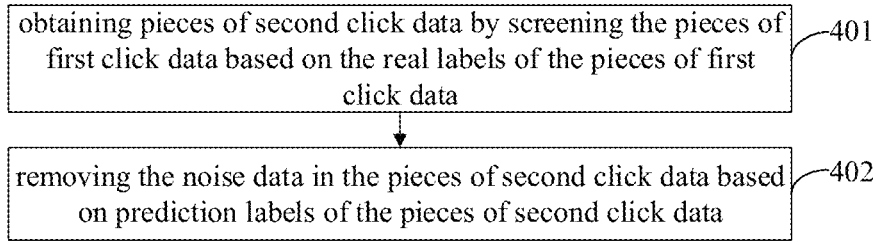
FIG. 4 is flowchart of a method for removing noise data in the pieces of first click data according to an embodiment of the disclosure.

In an implementation shown in FIG. 4, removing noise data in the at least two pieces of first click data based on the at least two pieces of first click data, the real label and the prediction label of each piece of first click data at 107 includes the following steps at 401-402.

At 401, at least two pieces of second click data are obtained by screening the at least two pieces of first click data based on real labels of the at least two pieces of first click data.

The at least two pieces of second click data are obtained by screening the at least two pieces of first click data based on the real labels of the at least two pieces of first click data.

At 402, noise data in the at least two pieces of second click data are removed based on prediction labels of the at least two pieces of second click data.

The noise data in multiple pieces of second click data are removed based on the prediction labels of multiple pieces of second click data.

In the embodiment, three methods are provided for removing the noise data in the multiple pieces of second click data based on the prediction labels of the multiple pieces of second click data.

In the first method, a prediction threshold is obtained by averaging the prediction labels of all second click data, and the second click data with the prediction label less than the prediction threshold is determined as noise data In the second method, a prediction threshold is preconfigured, and the second click data with the prediction label less than the prediction threshold is determined as noise data.

In the third method, at least two pieces of second click data and a prediction label of each piece of second click data are input into a cleanlab tool, and the cleanlab tool may recognize noise data based on the at least two pieces of second click data and the prediction label of each piece of second click data.

Firstly, a part of first click data that is not likely to be the noise data is filtered out with the real label of the first click data, the remaining first click data that cannot be determined as the noise data is determined as the second click data, and it is then determined whether the second click data are the noise data based on the prediction label of the second click data. In this way, the denoising first click data is completed, which may reduce data volume to be calculated and enhance the efficiency of denoising the click data.

Figure 5:
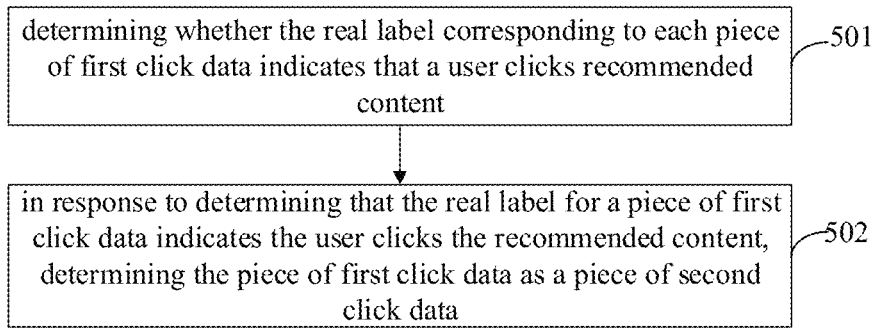
FIG. 5 is flowchart of a method for screening the pieces of first click data according to an embodiment of the disclosure.

In an implementation shown in FIG. 5, obtaining the at least two pieces of second click data by screening the at least two pieces of first click data based on the real labels of the at least two pieces of first click data at 401, includes the following steps at 501-502.

At 501, it is determined whether the real label corresponding to each piece of first click data indicates that the user clicks recommended content.

It is determined whether the real label corresponding to each piece of first click data represents that the user corresponding to the piece of first click data clicks the recommended content.

At 502, in response to determining that the real label for the piece of first click data indicates the user clicks the recommended content, the piece of first click data is determined as a piece of second click data.

The piece of first click data with the real label indicating that the user corresponding to the piece of first click data clicks the corresponding recommended content is determined as a piece of second click data. The real label for the piece of first click data may indicate that the user corresponding to the piece of first click data clicks the corresponding recommended content, or indicate that the user corresponding to the piece of first click data does not click the corresponding recommended content. The noise data refers to that the user clicks the recommended content due to casual click or other reasons. Thus, it is impossible that the first piece of click data with a real label indicating that the user does not click the corresponding recommended content, is the noise data. By screening in advance the first click data that cannot be the noise data based on the real label, may reduce data volume to be calculated and enhance the efficiency of denoising click data.

Figure 6:
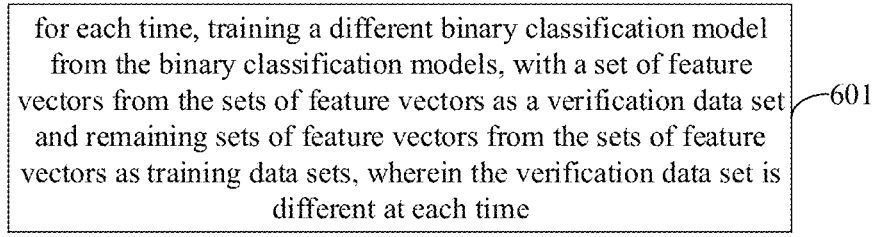
FIG. 6 is flowchart of a method for training the binary classification models according to an embodiment of the disclosure.

In an implementation shown in FIG. 6, training the at least two binary classification models with the at least two sets of feature vectors at 104 includes the following step at 601.

At 601, at least two trained binary classification models are obtained by training a different binary classification model from the at least two binary classification models for each of at least two times, with a set of feature vectors from the at least two sets of feature vectors as a verification data set and remaining sets of feature vectors from the at least two sets of feature vectors as training data sets. The verification data set is different at each time.

The at least two binary classification models are trained for at least two times with the at least two sets of feature vectors to obtain the at least two trained binary classification models. For each time, a different one of the binary classification models is trained with a different feature vector set as the verification data set and the remaining feature vector sets as the training data sets.

For example, when the plurality of feature vectors are divided into five sets of feature vectors, that is, the first set of feature vectors, the second set of feature vectors, the third set of feature vectors, the fourth set of feature vectors and the fifth set of feature vectors, five binary classification models need to be trained.

The first binary classification model is trained with the first set of feature vectors as a verification set, and with the second set, the third set, the fourth set and the fifth set of feature vectors as training data sets, to obtain a trained first binary classification model.

The second binary classification model is trained with the second set of feature vectors as a verification set, and with the first set, the third set, the fourth set and the fifth set of feature vectors as training data sets, to obtain a trained second binary classification model.

The third binary classification model is trained with the third set of feature vectors as a verification set, and with the first set, the second set, the fourth set and the fifth set of feature vectors as training data sets, to obtain a trained third binary classification model.

The fourth binary classification model is trained with the fourth set of feature vectors as a verification set, and with the first set, the second set, the third set and the fifth set of feature vectors as training data sets, to obtain a trained fourth binary classification model.

The fifth binary classification model is trained with the fifth set of feature vectors as a verification set, and with the first set, the second set, the third set and the fourth set of feature vectors as training data sets to obtain a trained fifth binary classification model.

The trained binary classification models are finally obtained, in which there is no correspondence between a verification set and a binary classification model, only the verification sets of the at least two binary classification models need to be different, and the training sets are crossed but not exactly the same. Therefore, the at least two binary classification models after training have different abilities of predicting the feature vectors. Then, at least two prediction values are obtained for each feature vector when the trained binary classification models predict the feature vector, so that the prediction label calculated based on the at least two prediction values may be more accurate, which greatly improves a final effect of denoising click data.

Figure 7:
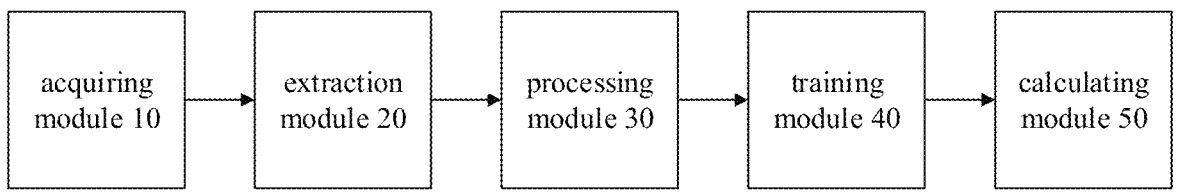
FIG. 7 is a structural diagram of an apparatus for denoising click data according to an embodiment of the disclosure.

An apparatus for denoising click data according to an embodiment of the disclosure is provided. As illustrated in FIG. 7, the apparatus includes an acquiring module 10, an extraction module 20, a processing module 30, a training module 40 and a calculating module 50.

The acquiring module 10 is configured to acquire a set of click data, in which the set of click data includes at least two pieces of first click data and a real label corresponding to each piece of first click data. The extraction module 20 is configured to extract a feature vector of each piece of first click data with a graph model. The processing module 30 is configured to divide a plurality of feature vectors into at least two sets of feature vectors. The training module 40 is configured to obtain at least two trained binary classification models by training at least two binary classification models with the at least two sets of feature vectors. The calculating module 50 is configured to obtain at least two prediction values corresponding to each of the feature vectors by predicting each of the feature vectors with the at least two trained binary classification models, and calculate a prediction label of each of the feature vectors based on the at least two prediction values corresponding to each of the feature vectors. The processing module 30 is further configured to remove noise data in the at least two pieces of first click data, based on the at least two pieces of first click data, the real label and the prediction label of each piece of first click data.

The acquiring module 10 is further configured to: acquire a user identifier and a recommended content identifier associated with each piece of first click data; and acquire user data and content data associated with each piece of first click data based on the user identifier and the recommended content identifier associated with each piece of first click data.

The acquiring module 10 is further configured to acquire a training set of click data. The training module 40 is further configured to train a graph model with the training set of click data.

The processing module 30 is further configured to: obtain at least two pieces of second click data by screening the at least two pieces of first click data based on the real labels of the at least two pieces of first click data; and remove noise data in the at least two pieces of second click data based on the prediction labels of the at least two pieces of first click data.

The processing module 30 is further configured to, in response to determining that the real label corresponding to a piece of first click data indicates that a user clicks recommended content, determine the piece of first click data as a piece of second click data.

The training module 40 is further configured to obtain at least two trained binary classification models by training a different binary classification model from the at least two binary classification models for each of at least two times, with a set of feature vectors from the at least two sets of feature vectors as a verification data set and remaining sets of feature vectors from the at least two sets of feature vectors as training data sets, wherein the verification data set is different at each time.

The acquisition, storage, and application of the user personal information involved in the technical solution of the disclosure comply with relevant laws and regulations, and do not violate public order and good customs.

According to the embodiment of the disclosure, an electronic device, a readable storage medium and a computer program product are further according to the disclosure.

Figure 8:
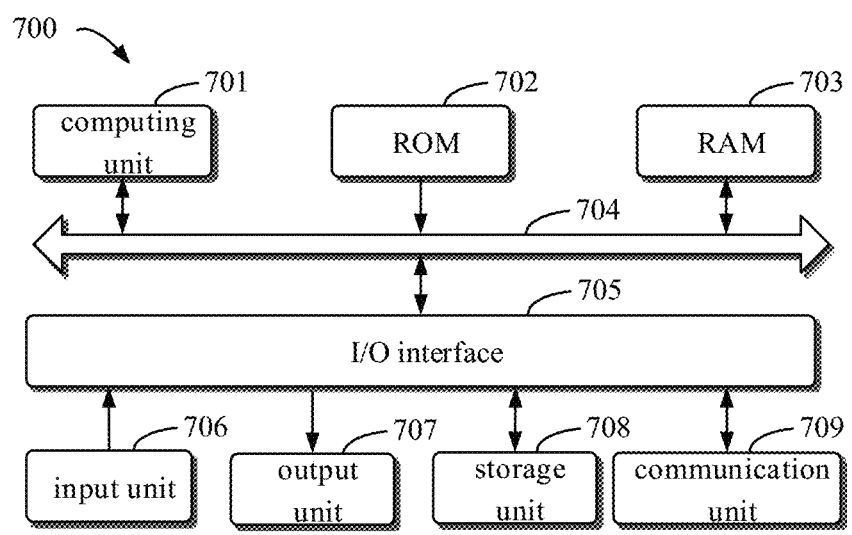
FIG. 8 is a block diagram of an electronic device configured to achieve a method for denoising click data in an embodiment of the disclosure.

FIG. 8 illustrates a schematic block diagram of an example electronic device 700 configured to implement the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 3, a device 700 includes a computing unit 701, configured to execute various appropriate actions and processes according to a computer program stored in a read-only memory (ROM) 702 or loaded from a storage unit 708 to a random access memory (RAM) 703. In a RAM 703, various programs and data required by an operation of a device 700 may be further stored. The computing unit 701, the ROM 702 and the RAM 703 may be connected with each other by a bus 704. An input/output (I/O) interface 705 is also connected to the bus 704.

A plurality of components in the device 700 are connected to an I/O interface 705, and includes: an input unit 706, for example, a keyboard, a mouse, etc.; an output unit 707, for example various types of displays, speakers; a memory unit 708, for example a magnetic disk, an optical disk; and a communication unit 709, for example, a network card, a modem, a wireless transceiver. The communication unit 709 allows the device 700 to exchange information/data through a computer network such as internet and/or various types of telecommunication networks and other devices.

The computing unit 701 may be various types of general and/or dedicated processing components with processing and computing ability. Some examples of the computing unit 701 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 701 executes various methods and processings as described above, for example, a method for denoising click data. For example, in some embodiments, the method for denoising click data may be further achieved as a computer software program, which is physically contained in a machine-readable medium, such as the storage unit 708. In some embodiments, a part or all of the computer program may be loaded and/or installed on the device 700 via the ROM 702 and/or a communication unit 709. When the computer program is loaded on the RAM 703 and executed by the computing unit 701, one or more steps of the method for denoising click data as described above may be performed. Alternatively, in other embodiments, the computing unit 701 may be configured to perform a method for denoising click data in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, the one or more computer programs may be executed and/or interpreted on a programmable system including at least one programmable processor, the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with a user, the systems and technologies described here may be implemented on a computer, and the computer has: a display apparatus for displaying information to a user (for example, a CRT (cathode ray tube) or a LCD (liquid crystal display) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, and further may be a server of a distributed system, or a server in combination with a blockchain.

It should be understood that, various forms of procedures shown above may be configured to reorder, add or delete steps. For example, steps described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the principle of embodiments of the present disclosure shall be included within the protection scope of the present disclosure.

What is claimed is:

1. A method for denoising click data in big data and cloud services, performed by an electronic device, comprising:
    acquiring a user identifier and a recommended content identifier associated with each piece of first click data, wherein each piece of the first click data indicates a piece of content is recommended to a user;
    acquiring user data and content data associated with each piece of the first click data based on the user identifier and the recommended content identifier;
    extracting a feature vector of each piece of the first click data with a graph model;
    dividing a plurality of feature vectors into sets of feature vectors;
    obtaining trained binary classification models by training binary classification models with the sets of feature vectors;
    for each of the plurality of feature vectors, obtaining prediction values of the feature vector by predicting the feature vector with the trained binary classification models;
    for each of the plurality of feature vectors, calculating a prediction label of the feature vector based on the prediction values of the feature vector;
    in response to determining that a real label corresponding to each piece of the first click data indicates that the user clicks the piece of content recommended, determining the piece of first click data as a piece of second click data; and
    removing noise data in pieces of second click data based on prediction labels of the pieces of second click data, wherein the noise data refers to that the user casually clicks the piece of content recommended.

2. The method of claim 1, wherein before extracting the feature vector of each piece of the first click data with the graph model, the method further comprises:
    acquiring a training set of click data; and
    training the graph model with the training set of click data.

3. The method of claim 1, wherein training the binary classification models with the sets of feature vectors, comprises:
    for each time, training a different binary classification model from the binary classification models, with a set of feature vectors from the sets of feature vectors as a verification data set and remaining sets of feature vectors from the sets of feature vectors as training data sets, wherein the verification data set is different at each time.

4. An electronic device, comprising:
    at least one processor; and
    a memory, stored with instructions executable by the at least one processor, wherein the at least one processor is caused to:
        acquiring a user identifier and a recommended content identifier associated with each piece of first click data, wherein each piece of the first click data indicates a piece of content is recommended to a user;
        acquiring user data and content data associated with each piece of the first click data based on the user identifier and the recommended content identifier;
        extracting a feature vector of each piece of the first click data with a graph model;
        dividing a plurality of feature vectors into sets of feature vectors;
        obtaining trained binary classification models by training binary classification models with the sets of feature vectors;
        for each of the plurality of feature vectors, obtaining prediction values of the feature vector by predicting the feature vector with the trained binary classification models;
        for each of the plurality of feature vectors, calculating a prediction label of the feature vector based on the prediction values of the feature vector;
        in response to determining that a real label corresponding to each piece of the first click data indicates that the user clicks the piece of content recommended, determining the piece of first click data as a piece of second click data; and
        removing noise data in pieces of second click data based on prediction labels of the pieces of second click data, wherein the noise data refers to that the user casually clicks the piece of content recommended removing.

5. The electronic device of claim 4, wherein before extracting the feature vector of each piece of the first click data with the graph model, the at least one processor is caused to:
    acquiring a training set of click data; and
    training the graph model with the training set of click data.

6. The electronic device of claim 4, wherein training the binary classification models with the sets of feature vectors, comprises:
    for each time, training a different binary classification model from the binary classification models, with a set of feature vectors from the sets of feature vectors as a verification data set and remaining sets of feature vectors from the sets of feature vectors as training data sets, wherein the verification data set is different at each time.

7. A non-transitory computer-readable storage medium stored with computer instructions, wherein, the computer instructions are configured to cause a computer to perform a method for denoising click data, the method comprising:
    acquiring a user identifier and a recommended content identifier associated with each piece of first click data, wherein each piece of the first click data indicates a piece of content is recommended to a user;

acquiring user data and content data associated with each piece of the first click data based on the user identifier and the recommended content identifier;

extracting a feature vector of each piece of the first click data with a graph model;

dividing a plurality of feature vectors into sets of feature vectors;

obtaining trained binary classification models by training binary classification models with the sets of feature vectors;

for each of the plurality of feature vectors, obtaining prediction values of the feature vector by predicting the feature vector with the trained binary classification models;

for each of the plurality of feature vectors, calculating a prediction label of the feature vector based on the prediction values of the feature vector;

in response to determining that a real label corresponding to each piece of the first click data indicates that the user clicks the piece of content recommended, determining the piece of first click data as a piece of second click data; and removing noise data in pieces of second click data based on prediction labels of the pieces of second click data, wherein the noise data refers to that the user casually clicks the piece of content recommended.

8. The storage medium of claim 7, wherein before extracting the feature vector of each piece of the first click data with the graph model, the method further comprises:

acquiring a training set of click data; and training the graph model with the training set of click data.

9. The storage medium of claim 7, wherein training the binary classification models with the sets of feature vectors, comprises:

for each time, training a different binary classification model from the binary classification models, with a set of feature vectors from the sets of feature vectors as a verification data set and remaining sets of feature vectors from the sets of feature vectors as training data sets, wherein the verification data set is different at each time.

* * * * *